(12) United States Patent
Nix

(10) Patent No.: US 6,918,235 B2
(45) Date of Patent: Jul. 19, 2005

(54) DUAL MOTOR STRAPPER

(75) Inventor: Robert J. Nix, Algonquin, IL (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

(21) Appl. No.: 10/839,556

(22) Filed: May 5, 2004

(65) Prior Publication Data

US 2004/0206251 A1 Oct. 21, 2004

Related U.S. Application Data

(62) Division of application No. 10/171,890, filed on Jun. 14, 2002.

(51) Int. Cl.[7] .................................................. B65B 11/00
(52) U.S. Cl. ..................................... 53/582; 100/33 PB
(58) Field of Search ....................... 53/582–593, 375.8, 53/375.9; 100/33 PB

(56) References Cited

U.S. PATENT DOCUMENTS

| | | |
|---|---|---|
| 3,654,033 A | 4/1972 | Angarola et al. |
| 4,313,779 A | 2/1982 | Nix |
| 5,380,393 A | 1/1995 | Drabarek et al. |
| 5,954,899 A | 9/1999 | Figiel et al. |
| 6,079,456 A | 6/2000 | Drabarek et al. |
| 6,338,375 B1 | 1/2002 | Harada |

FOREIGN PATENT DOCUMENTS

| | | |
|---|---|---|
| EP | 0593261 B1 | 10/1993 |
| EP | 0947426 A1 | 3/1999 |
| EP | 1008520 A1 | 12/1999 |

*Primary Examiner*—John Paradiso
(74) *Attorney, Agent, or Firm*—Mark W. Croll, Esq.; Donald J. Breh, Esq.; Welsh & Katz, Ltd.

(57) ABSTRACT

A pneumatic strapping tool for tensioning a strap around a load, adhering the strap onto itself, and cutting a feed end of the strap includes a piston, a weld motor operably connected to the piston and a vibrating weld element operably connected to the piston for contacting the strap and adhering the strap onto itself. A tensioning motor is configured for unidirectional rotation. A feed wheel is operably connected to the tensioning motor by a drive assembly to tension the strap prior to adhering the strap onto itself. A transmission cooperates with the drive assembly and is switchable between a first state in which the transmission engages the drive assembly to permit only one-way rotation of the drive assembly and a second state in which the transmission permits two-way rotation of the drive assembly. The strapping tool includes a self-contained pneumatic module that is removably mounted to a cylinder housing. The module includes a compressed gas inlet, a plurality of valves and passageways between the inlet and the valves to provide compressed gas to the cylinder housing, a pneumatic weld motor and the pneumatic tensioning motor. The module includes at least one timer for operation of the weld motor and for providing pressure to the cylinder. An articulating guide is disposed at the strap path and moves between an open path position when the tensioning motor housing is pivoted to the loading/unloading position and a closed path position when the tensioning motor housing is pivoted to the strap engaging position. The guide aligns the strap with a second strap to which the strap it is adhered and aligns the straps with the feed wheel and anvil.

6 Claims, 7 Drawing Sheets

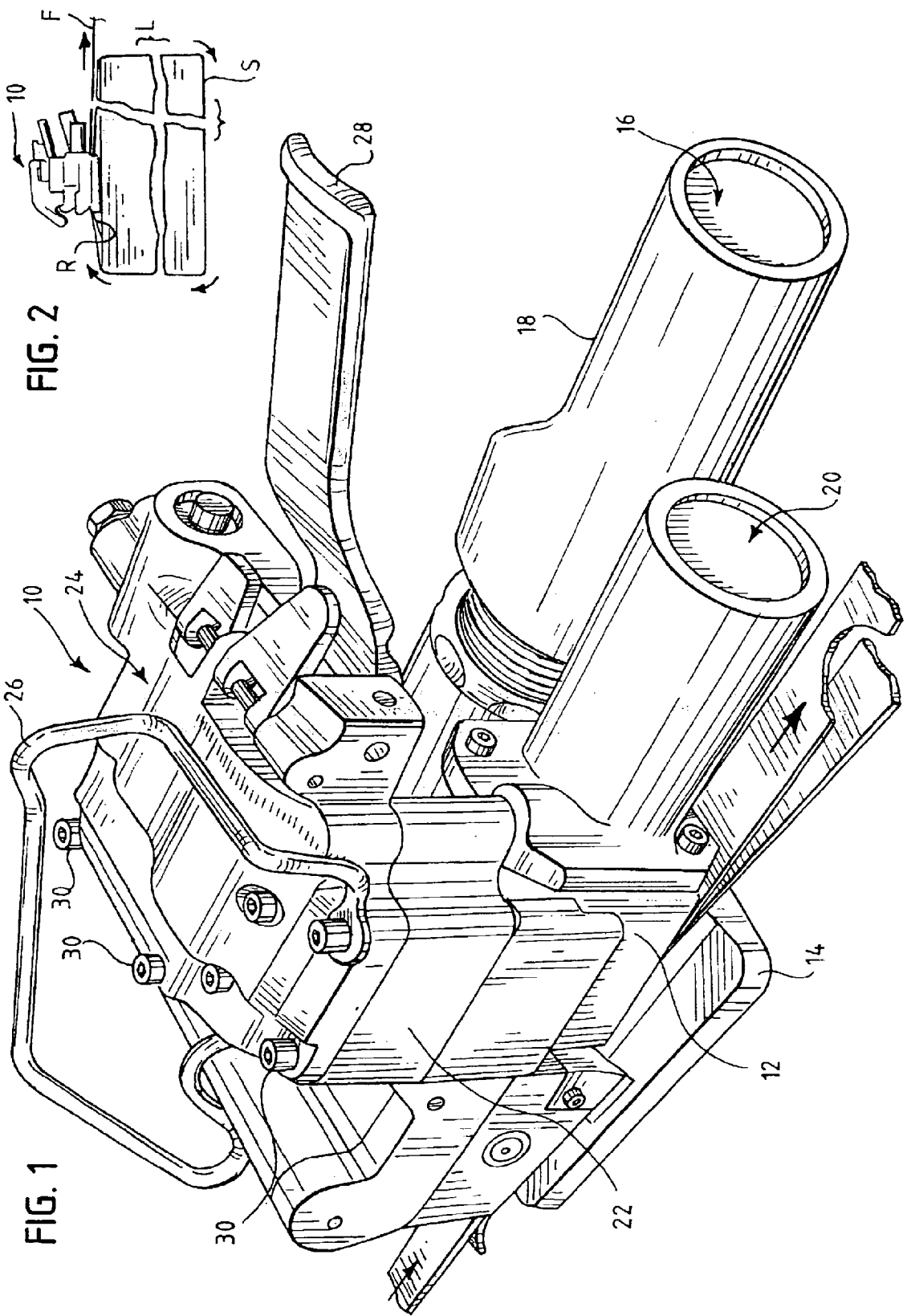

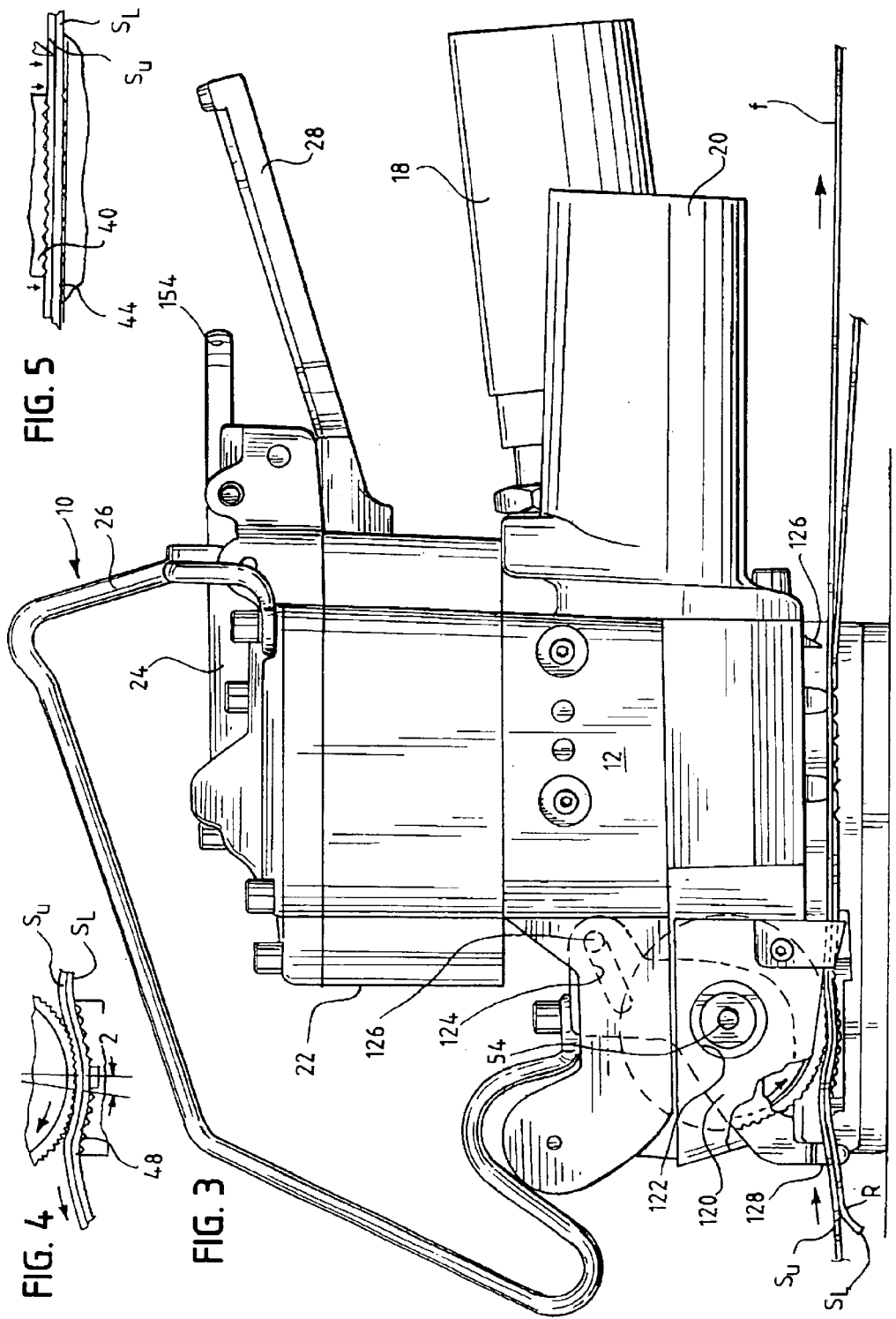

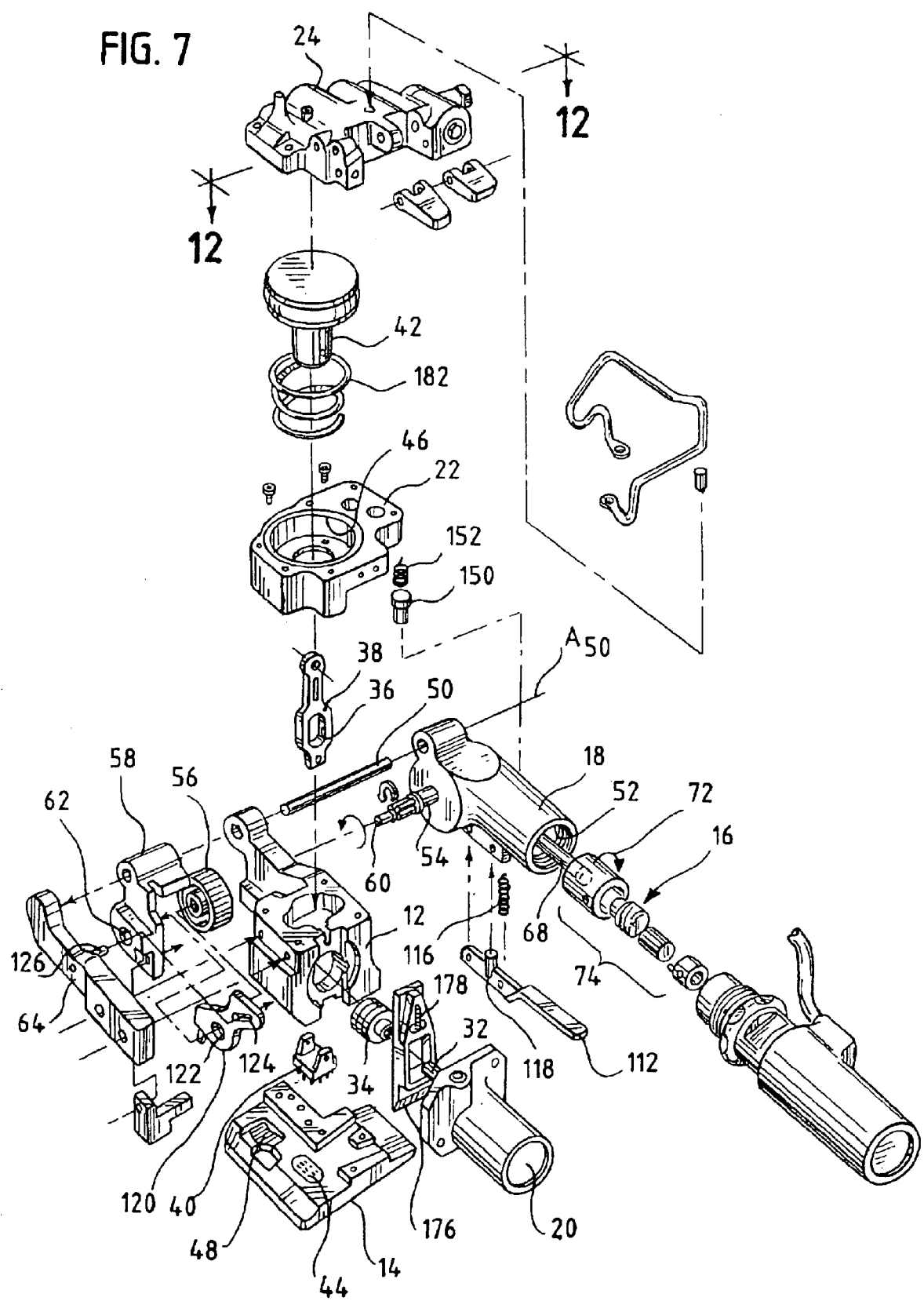

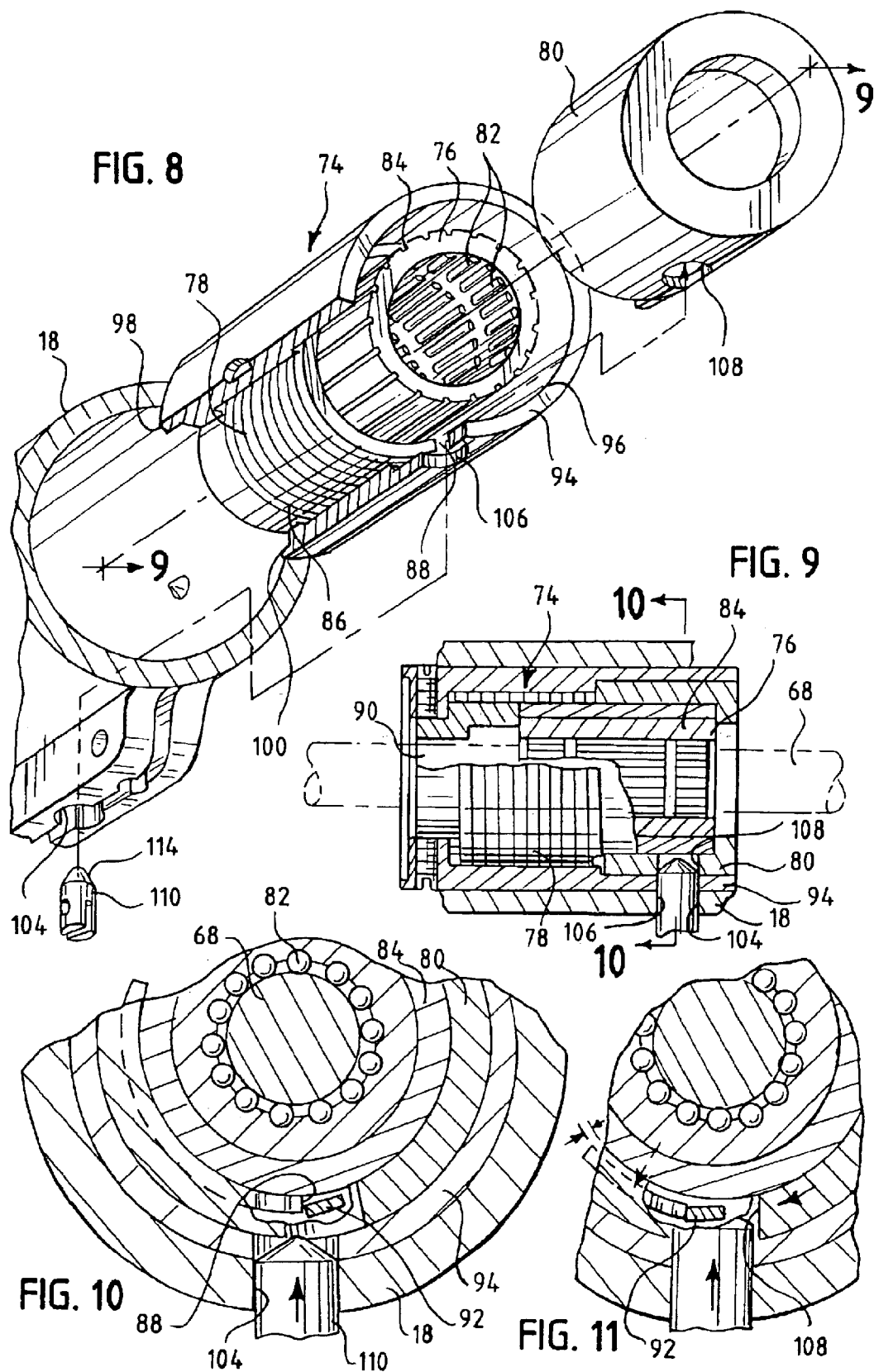

DUAL MOTOR STRAPPER

CROSS-REFERENCE TO RELATED APPLICATION DATA

This application is a divisional application of U.S. patent application Ser. No. 10/171,890, filed Jun. 14, 2002.

BACKGROUND OF THE INVENTION

The present invention pertains to an improved tool for tightening a strap around an object or load and adhering the strap onto itself. More particularly, the present invention is directed to a dual pneumatic motor tool for tensioning a strap around a load and welding or melt-adhering the strap onto itself.

Strapping tools are well-known in the art. These tools come in a wide variety of types, from fully manual tools to automatic, table-top tools. These tools are generally specifically designed for use with metal strapping or plastic/polymeric type strapping.

Typically, strappers for applying plastic or polymeric strapping materials are automatic table-top or hand-held devices. This is generally necessary in order to provide energy for adhering the strapping material onto itself. Typically, the adhering function is provided by melting or otherwise welding a section of the strapping material onto itself. Such melting or welding operations are generally carried out using ultrasonic or vibrational-type weld assemblies. The movement or vibrational motion can be provided by electrical, electromechanical or fluid drive (hydraulic or pneumatic) systems.

In one exemplary tool, a pneumatic system is used to vibrate contacting interfacial surfaces of overlapping plastic strap portions. The tool includes a clamping member for anchoring a strap free end portion, and a rotatable feed wheel cooperating with an anvil foot to engage a feed strap portion that is tensioned about the load. A clutch engagably couples the feed wheel to a pneumatic motor which also vibrates a jaw that welds the overlapping strap portions.

In this single motor arrangement, the motor stalls and tensioning stops at a specified strap tension. A pneumatically actuated ram disengages the motor from the feed wheel and engages the feed wheel break that maintains feed wheel tension on the tensioned strap during welding. Such a tool is disclosed in U.S. Pat. No. 3,564,033 to Angarola et al., which patent is assigned commonly herewith, and is incorporated herein by reference. The actuated ram also moves the vibrating jaw into frictional engagement with the overlapping strap portions. As the vibrating jaw moves toward the overlapping strap portions, a sheering edge severs the upper strap and the overlapping strap portions are subsequently welded together. The pressure is maintained on the welded overlapping strap portions for a cool down period to complete the weld.

Another exemplary tool, disclosed in U.S. Pat. No. 5,380,393 to Drabarek et al., also assigned commonly herewith and incorporated herein by reference, discloses a strapping tool having a pneumatic circuit for automatically controlling tool operation, including the timing and duration of strap welding and the cool down period. A pneumatically actuated ram extended after strap tensioning pivots a cam that moves a vibrating weld plate into contact with overlapping strap portions to form the weld. Vibration of the weld plate terminates after a time period controlled by the accumulation of air in a chamber. Air is subsequently bled from a cylinder that counter-pivots the ram to move the welding plate away from the welded strap portions after the cool down period.

As will be recognized by those skilled in the art, known pneumatic strapping tools require many system components that increase the size and weight of the tool. In addition, even though the pneumatic circuit of the above-mentioned U.S. Pat. No. 5,380,393 automates many strapping operations otherwise performed manually, controlling timing of the various tool operations as relatively and precise, and as a result inconsistent strap tension and welds may result.

In operation of strapping tools, after tension is applied to the strap, and prior to welding, the tension must be slightly released so that the (welded) strap can be removed from the tool. Otherwise, the tension is typically so high and the foot or anvil is "pinched" so tightly between the strap and the load, that the tool is extremely difficult to remove without damaging the strap.

In order to accomplish the release or backing-off of the tension, in many known strapping tools the tensioning motor is reversed or gearing is used to permit roll back of the feed wheel. As such, either the feed (tensioning) motor must be a two-way motor or complex gearing is required to carry out the necessary functions of the tool.

Accordingly, there exists a need for a pneumatic strapping tool that uses two pneumatic motors, one motor for tensioning or feeding strap and another, separate motor for welding the strap material onto itself. Desirably, such a tool uses one-way or unidirectional pneumatic motors. Most desirably, such a tool has a self contained modular pneumatic member or module that includes pneumatically controlled timing circuits and is readily installed onto and removed from the body and motor portions of the tool. Even more desirably, such a tool incorporates guide elements to properly position and align the strap material between the anvil and the feed wheel to assure optimal strap welding.

BRIEF SUMMARY OF THE INVENTION

A pneumatic strapping tool tensions strap around a load, adhering the strap onto itself, and cuts a feed end of the strap. The strapper includes a piston, a weld motor operably connected to the piston and a vibrating weld element operably connected to the piston for contacting the strap and adhering the strap onto itself.

A tensioning motor is configured for unidirectional rotation. A feed wheel rotates about a feed wheel shaft and is operably connected to the tensioning motor by a drive assembly to tension the strap prior to adhering the strap onto itself. A transmission cooperates with the drive assembly. The transmission is switchable between a first state in which the transmission engages the drive assembly to permit only one-way rotation of the drive assembly and a second state in which the transmission permits two-way rotation of the drive assembly.

In a present embodiment, the drive assembly includes a drive shaft and the transmission includes a one-way bearing that bears on the drive shaft. The one-way bearing permits one-way rotation of the drive shaft and prevents rotation of the drive shaft in an opposing direction.

The transmission can include a spring clutch engageable with the bearing. The spring clutch, in a first state binds on the bearing to prevent rotation of the bearing relative to the spring clutch. In a second state, the spring clutch permits rotation of the bearing relative to the spring clutch.

A release element cooperates with the spring clutch to move the spring clutch from the first state to the second state. The release element can be configured as a collar fitted onto a portion of the bearing adjacent the spring clutch. The collar includes a finger engageable with an end of the spring clutch to urge the spring clutch to a diameter larger than a diameter when the spring clutch binds on the bearing. The larger diameter state corresponds to the second state.

In a present strapping tool, the tensioning motor and transmission are contained within a tensioning motor housing. A release pin is disposed on the housing to traverse through the housing and rotate the collar to engage the spring clutch.

The tool further includes a cylinder housing, a piston disposed within a cylinder in the cylinder housing, a pneumatic weld motor operably connected to the piston and a vibrating weld element operably connected to the piston for contacting the strap and adhering the strap onto itself.

To effect operation of the strapper, the tools includes self-contained pneumatic module that is removably mounted to the cylinder housing. The pneumatic module including a compressed gas inlet, a plurality of valves and passageways between the inlet and the valves to provide compressed gas to the cylinder housing, the pneumatic weld motor and the pneumatic tensioning motor.

The module also includes at least one timer for operation of the weld motor and for providing pressure to the cylinder. A part or portion of an accumulator for controlling timing of the weld motor is formed in the module, and the other part or portion of the accumulator is formed in the cylinder housing.

The tool further includes a tensioning piston mounted in part in the cylinder housing. The tensioning piston is actuated by compressed gas from the pneumatic module when the pneumatic tension motor is actuated. The tensioning piston acts against the tensioning motor housing when the tool is operating in the tensioning mode.

The pneumatic module includes a tensioning motor valve for controlling compressed gas flow to the tensioning motor and a weld cycle valve for controlling compressed gas flow to the weld motor and piston. The tensioning motor valve and the weld cycle valve are operable independently of one another.

A pilot valve is configured to initiate and terminate flow of compressed gas to the tensioning motor valve and the weld cycle valve, that is, to the pneumatic module.

In a present embodiment, the module includes a tensioning motor valve actuated by a tensioning motor valve switch, for providing compressed gas flow to the pneumatic tensioning motor when the tensioning motor valve is in an on position. The module further including a weld cycle valve for providing compressed gas flow to the pneumatic weld motor and to the cylinder through a first pneumatic timer. Compressed gas flow is further provided to the accumulator through a second timer. When compressed gas pressure in the accumulator reaches a predetermined value, a pressure is applied to the pilot valve to close the pilot valve and to terminate compressed gas supply to the weld cycle valve. Pressure is vented from the cylinder through the second pneumatic timer to control cool down of the strap following welding.

In another aspect of the invention, an articulating guide is disposed at the strap path. The guide pivots about the feed wheel shaft between an open path position and a closed path position.

In the open path position, that is when the tensioning motor housing is pivoted to the loading/unloading position, the guide moves upwardly to permit inserting a strap between the feed wheel and anvil. In the closed path position, that is when the tensioning motor housing is pivoted to the strap engaging position, the guide blocks insertion of the strap between the feed wheel and the anvil and aligns the strap with a second strap to which the strap is to be adhered. The guide is further configured to align the strap and the second strap with the feed wheel and anvil for tensioning. To align the straps the guide includes a depending finger for movement in to and out of the strap path.

To effect articulation, the guide includes an elongated slot and the strapping tool includes a pin extending therefrom for engaging the slot. The pin is fixed relative to the pivotal movement of the tensioning motor housing. The pin engages the slot to pivot the guide between the open path position and the closed path position. The finger can be formed in a plane spaced inwardly of a plane of the guide to urge the strap toward the feed wheel and anvil when the finger is in the closed path position.

A feed wheel cover includes a notch formed therein for receiving a portion of the guide when the guide is pivoted to the closed path position. The notch maintains the guide laterally in place relative to the feed wheel.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a perspective view of a dual pneumatic motor strapper embodying the principles of the present invention, the tool being shown with a strap material positioned in the tool, and showing the direction of movement of the material during tensioning;

FIG. 2 illustrates the tool positioned relative to a load being strapped and the direction of movement of the strap material during tensioning;

FIG. 3 is a side view of the strapping tool shown in the operating or engaged position in which the fed wheel engages the strap material;

FIG. 4 is a partial, enlarged view of the feed wheel and anvil with strap material engaged therebetween, and showing the "roll-back" of the feed wheel following tensioning and welding, at release;

FIG. 5 is a side view of the strap positioned between the anvil and feed wheel as illustrated in FIG. 4;

FIG. 7 is an exploded view of the strapping tool;

FIG. 8 is a partially exploded, partially cut-away view of the tensioning motor;

FIG. 9 is a cross-sectional view of the assembled motor taken along 9—9 of FIG. 8;

FIG. 10 is a partial cross-sectional view of the motor taken along line 10—10 of FIG. 9;

FIG. 11 is a partial view of the lower area of FIG. 10 showing the release plunger engaging the motor inner sleeve to release the spring clutch;

DETAILED DESCRIPTION OF THE INVENTION

Figure 6:
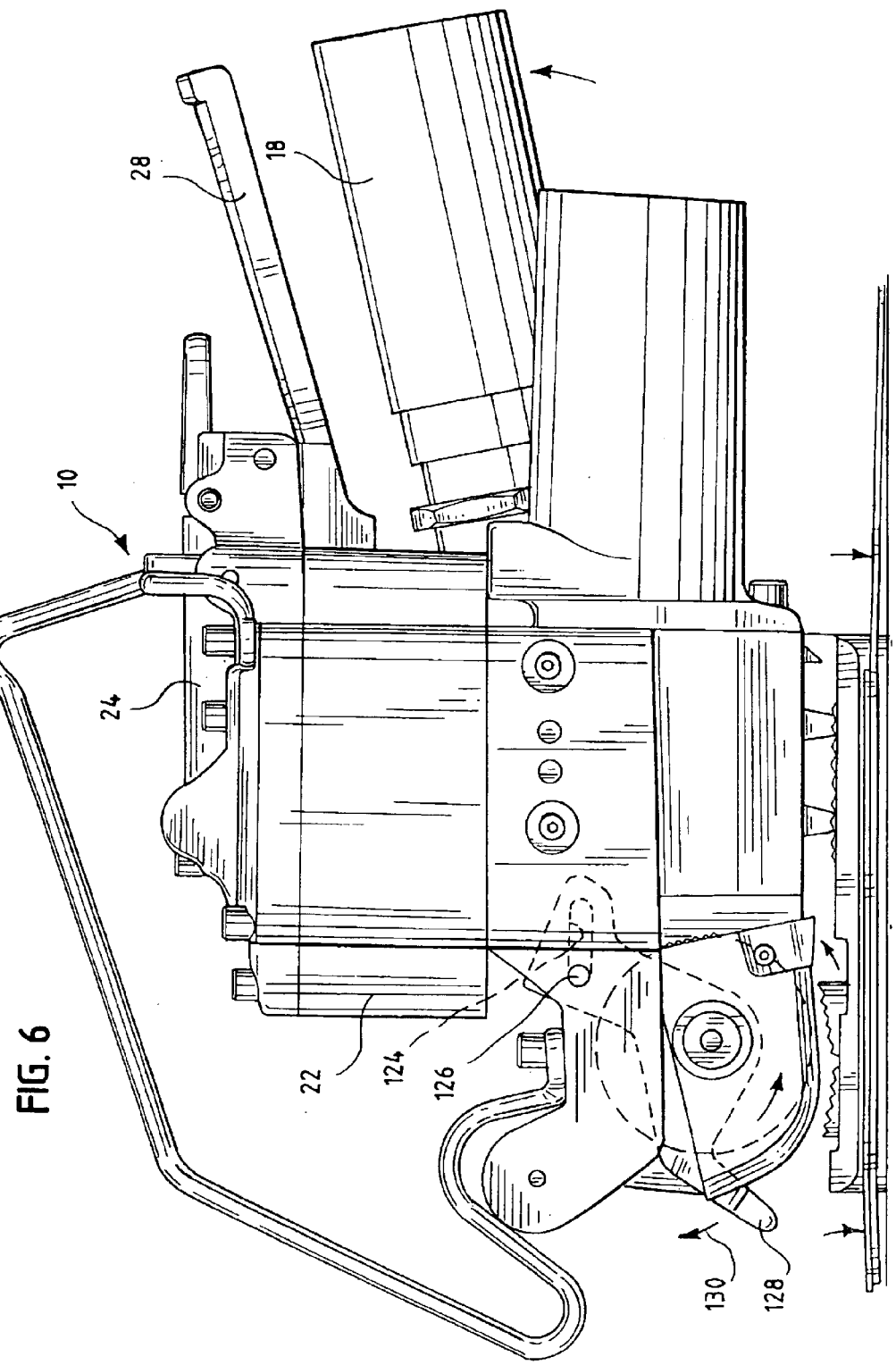
FIG. 6 is a side view of the strapping tool similar to FIG. 3, but showing the tool in the release or loading/unloading position to load strap material into the strapper tool and to remove the strap material after it has been welded onto itself.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIGS. 1 and 2, there is shown a dual pneumatic motor strapper or strapping tool 10 embodying the principles of the present invention. The tool 10 is configured to tension a strap S around a load L, weld the strap material S onto itself and sever a feed end F of the strap S. For purposes of the present disclosure, the strap material S will be referred to as having a feed end F which is the supply end of the material and a free end R which is that end of the material that is fed around the load L and reinserted into the strapping tool 10.

The tool 10 includes, generally, a body 12, a foot 14, a tensioning motor 16 and housing 18, a weld motor 20, a cylinder housing 22 and a pneumatic module 24. The tool 10 can include a handle 26 and grip 28, such as those shown for ease of handling and use. The pneumatic module 24, as will be discussed in more detail below, is mounted to the cylinder housing 22 which is in turn mounted to the body 12 and provides pneumatic pathways between the module 24, the cylinder housing 22 and the tensioning and welding motors 16, 20 for introducing and venting a compressed gas, such as compressed air, to and from the motors 16, 20. The module 24 is readily mounted to and removed from the housing 22 by a plurality of fasteners 30 such as bolts and the like.

Referring now to FIG. 7, the welding motor 20 is mounted to the body 12 in stationary relation so that the welding motor 20 and body 12 are fixed relative to one another. A weld motor shaft 32 extending from the motor 20 engages an eccentric element 34. The eccentric element 34 is positioned in an elongated opening 36 in an arm 38 that is operably connected at one end to a weld element 40 and at an opposing end to a piston 42. The piston 42 is positioned in the cylinder housing 22.

Upon actuation of the weld motor 20, the shaft 32 rotates which in turn rotates the eccentric element 34. The eccentric 34 is fitted into the elongated opening 36 so that as the motor 20 rotates, it imparts vibrational movement to the weld element 40. The upper and lower strap layers $S_U$, $S_L$ are positioned between the weld element 40 and a stationary weld pad 44 on the foot 14. The vibrational movement is transferred into the strap layers $S_U$, $S_L$ and welds the strap onto itself. The operation and construction of such vibrational weld elements 40 and the various arrangements to impart vibrational energy will be recognized and understood by those skilled in the art and are within the scope and spirit of the present invention.

To assure that sufficient pressure is exerted by the weld element 40, the piston receives compressed at the top of the piston 42 in the cylinder 46 when the tool 10 is in the welding cycle. The air forces the piston 42 downwardly to assure that the proper force is exerted on the strap S as the weld element 40 vibrates.

The foot 14 is likewise mounted to the body 12 so that foot 14 and body 12 are stationary relative to one another. The foot 14 includes an anvil 48 against which the strap S is held for tensioning. As set forth above, the weld pad 44 is positioned on the foot 14 to maintain a lower section of the strap $S_L$ stationary as an upper section of strap $S_U$ is vibrated to effect the weld.

The tensioning motor 16 is mounted in fixed relation to the tensioning motor housing 18 which is in turn pivotally mounted to the body 12 by a pivot pin 50. The pin 50 permits the motor housing 18 to pivot about an axis $A_{50}$. Gearing, indicated generally at 52, located within the housing 18 transfers the driving force from the motor 16 to a feed wheel shaft 54 on which a feed wheel 56 is mounted. As such, the feed wheel 56 pivots along with the tensioning motor 16 and housing 18 about the axis $A_{50}$.

The feed wheel 56 is positioned within a cover member 58. An end 60 of the feed wheel shaft 54 is secured in a sleeve 62 in the cover 58. A plate 64 extends over the cover 58 to secure the cover 58 to the body 12. In this manner the cover 58 pivots with the tensioning motor 16 and housing 18 (and feed wheel 56) while the plate 64 remains fixed to the body 12. The cover 58 prevents the feed wheel 56 from lateral movement.

The gearing 52 within the housing 18 for translating movement of the motor 16 to the feed wheel 56 includes a spiroid pinion (not shown) mounted to the motor shaft 68 and a spiroid gear (not shown) mounted to the feed wheel shaft 54 to translate the rotational movement ninety degrees from the motor 16 to the feed wheel 56. Such an arrangement, as well as other arrangements will be readily recognized and appreciated by those skilled in the art and are within the scope and spirit of the present invention.

The tensioning motor 16, as set forth above, is configured for one-way or unidirectional movement, as indicated by the rotational arrow at 72, when actuated by compressed air. It is, however, also configured to permit a slight "slip" in an opposite direction to accommodate the roll back necessary for releasing tension in the strap S to permit removing the tool 10 from the load L after the welding operation.

Referring now to FIGS. 8–11, unlike known strappers, the present strapper 10 uses a transmission assembly 74 that includes, generally, a one-way bearing 76, a spring clutch 78 and a release element 80, such as the exemplary movable collar or ring to accomplish the roll back. The motor shaft 68 is enveloped by or resides within the transmission assembly 74. The one-way bearing 76 is positioned around the shaft 68 and permits the shaft 68 to rotate in one direction, i.e., the driving direction 72 only. The bearing 76 includes a plurality of rollers 82 within a sleeve 84. The sleeve 84 remains stationary while the rollers 82 rotate to provide for smooth rotation of the shaft 68, and to prevent lateral shaft 68 movement. Those skilled in the art will recognize and understand the construction of such a one-way bearing 76.

The wrap spring clutch 78 is fitted over a portion of the bearing sleeve 84. The spring clutch 78 is formed as a coil spring having first and second ends 86, 88. The spring first end 86 is secured in a spring seat 90. The spring second end 88 lies along the coil periphery. The spring 78 has a relaxed state, that is a state in which the spring 78 is neither tensioned, compressed nor torqued (e.g., twisted). In the relaxed state, the spring 78 defines a diameter. When the spring 78 is in an other than relaxed state, such as when the spring 78 is torqued or twisted, the diameter changes, for example, increases.

The spring clutch 78 is positioned over a portion of the bearing sleeve 84 to bind on the sleeve 84 when the spring 78 is in the relaxed state, thus preventing movement of the bearing sleeve 84 relative to the spring 78. When the spring 78 is torqued or twisted, the diameter increases to allow the sleeve 84 to "slip" relative to the spring 78. It is this slippage that provides the roll back required to reduce the strap S tension.

To accomplish the twisting of the spring 78, the transmission includes a collar 80 that is fitted onto the bearing sleeve 84 abutting the spring 78. The collar 80 includes a finger or projection 92 extending longitudinally from an edge of the collar 80. While the collar 80 abuts the end coil of the spring 78, the finger 92 is configured to abut the second end 88 of the spring 78. In this manner, when the collar 80 is rotated, the finger 92 is urged against the end 88 of the coil to twist the spring 78. This, in turn, permits the bearing sleeve 84 (and the shaft 68) to rotate backward relative to the spring 78.

The transmission 74 is contained within an outer sleeve 94 that extends over the spring clutch 78 and collar 80 which are positioned over the bearing 76. A first end 96 of the outer sleeve 94 is open to the motor 16 and an opposing or second end 98 of the outer sleeve 94 has an opening 100 therein for the motor shaft 68 to pass through. The outer sleeve 94 is positioned within the tensioning motor 18 housing and fixedly mounted therein by a plurality of fasteners (not shown) that extend through the housing 18 and into the outer sleeve 94.

With reference now to FIGS. 10 and 11, in order to release the bearing 76 (i.e., torque the spring clutch 78), as set forth above, the collar 80 must be urged or rotated slightly so that the finger 92 contacts and moves the end 88 of the coil 78. To effect this slight rotation, the housing 18, outer sleeve 94 and collar 80 include openings 104, 106 and 108, respectively, therein. The housing opening 104 and outer sleeve opening 106 are fully aligned with one another. The collar opening 108, however, is slightly out of alignment with the housing and sleeve openings 104, 106 when the spring 78 is in the relaxed state. By moving the collar opening 108 into alignment with the other openings 104, 106, i.e., by slight rotation of the collar 80, the finger 92 urges against the end 88 of the spring coil 78, to twist or torque the coil 78 and release the bearing 76.

A release pin or plunger 110 and release handle 112 (FIG. 7) are mounted to the housing 18 such that the plunger 110 is disposed in the housing and sleeve openings 104, 106 when it is depressed. The plunger 110 is mounted for movement into the openings 104, 106, 108. The plunger 110 includes a tapered head 114 that contacts the side of the collar opening 108 and rotates or cams against the collar opening 108 to effect rotation of the collar 80 and release of the bearing 76 and shaft 68.

Referring again to FIG. 7, the release handle 112 is mounted to the housing 18, overlying the plunger 110 to maintain the plunger 110 in the openings 104, 106, 108 and to provide leverage to force or urge the plunger 110 inward to contact and align the collar opening 108. The handle 112 is biased outwardly by, for example, the exemplary handle spring 116. The handle spring 116 bias is readily overcome by gripping the handle 112, grip 28 and motor housing 18 and squeezing the handle 112 inward. The plunger 110 is mounted to the handle 112 by a pin 118 or the like so that as the handle 112 is released, it pulls the plunger 110 out of the collar opening 108.

In addition, when the handle 112 is released, the force of the spring clutch 78 against the collar finger 92 rotates the collar opening 108 out of alignment with the housing and sleeve openings 104, 106, thus further assisting in urging the plunger 110 outward. This action, i.e., removing the plunger 110 from the collar opening 108, permits the spring clutch 78 to return to the relaxed state, which in turn locks the bearing 76 within the spring clutch 78, preventing rearward rotation of the shaft 68 and feed wheel 56.

As set forth above, the tensioning motor 16, motor housing 18 and feed wheel 56 pivot between an engaged position (shown in FIG. 3) in which the feed wheel 56 rests on the anvil 48 (during strapping operations) and a loading/unloading position (FIG. 6) in which the feed wheel 56 is pivoted away from the anvil 48 to permit inserting or removing the strap S material from between the feed wheel 56 and anvil 48.

To assist in aligning the strapping material between the feed wheel 56 and anvil 48, the strapper 10 includes an articulating guide 120. The guide 120 is configured to assure that the upper layer of strapping material $S_U$ fully overlies the lower layer $S_L$ of material, and further assures that both the upper and lower layers $S_U$, $S_L$ are positioned fully under the feed wheel 56 and above the anvil 48.

The guide 120 is mounted to the tool 10 by an opening 122 in the guide 120 through which the feed wheel shaft 54 traverses and a slotted opening 124 in the guide 120 through which a pivot pin 126 (extending from the feed wheel cover plate 64) extends. Thus, as the tensioning motor housing 18 (and thus the feed wheel 56) is pivoted to the loading/unloading position, the guide 120 articulates or pivots. The pin 126 extending through the guide slot 124 articulates the guide 120 so that an aligning finger 128 moves upwardly out of the strap entry way, as indicated at 130. When the motor housing 18 is released to return to the engaged position, the guide 120 pivots downwardly to position the finger 128 in the entry path 130 which aligns the upper layer of strap material $S_U$ on the lower layer of material $S_L$. As best seen in FIG. 7, the aligning finger 128 extends downwardly and inwardly to "push" any misaligned strap between the feed wheel 56 and the anvil 48.

Figure 12:
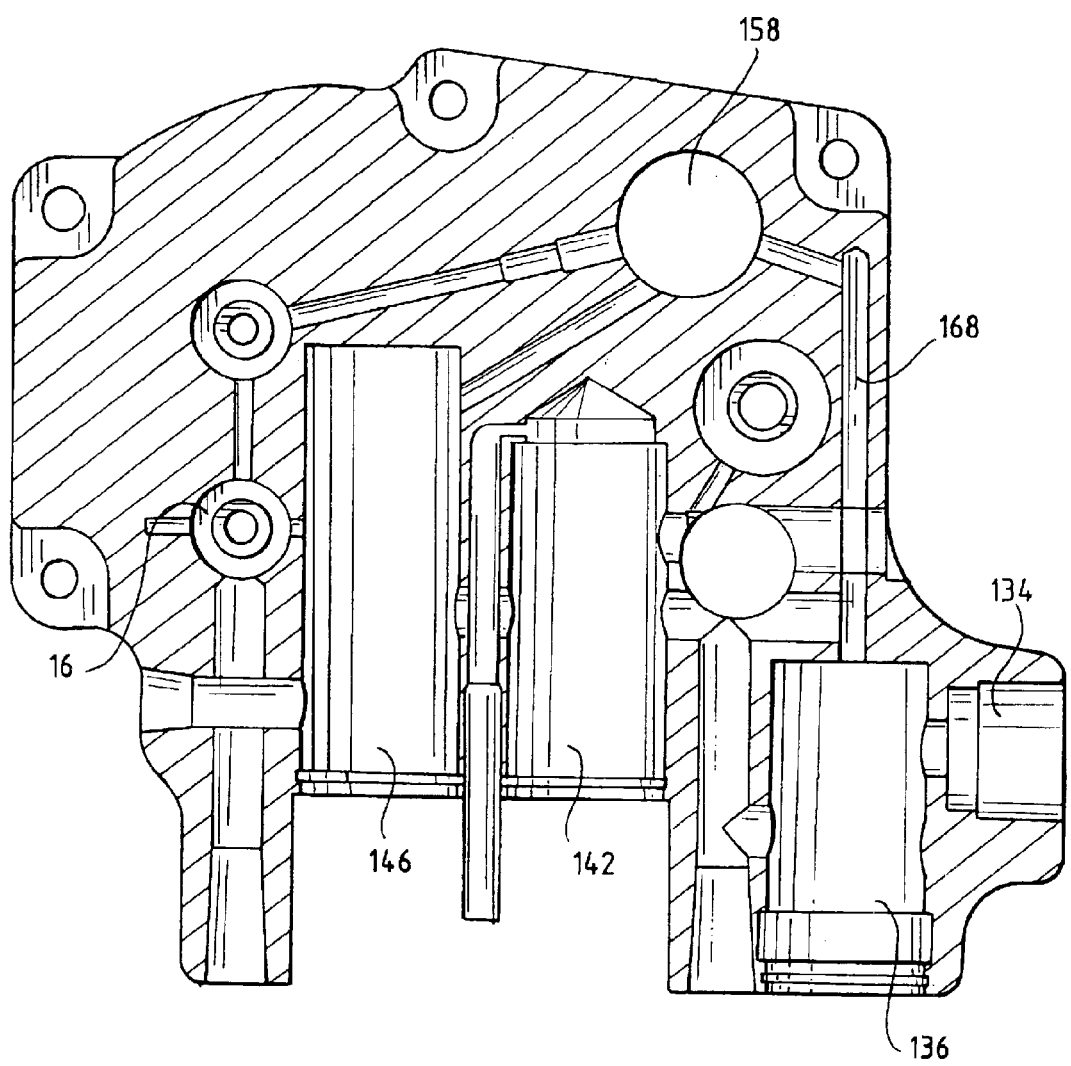
FIG. 12 is a cross-sectional view of the self contained pneumatic module taken along line 12—12 of FIG. 7.
Figure 13:
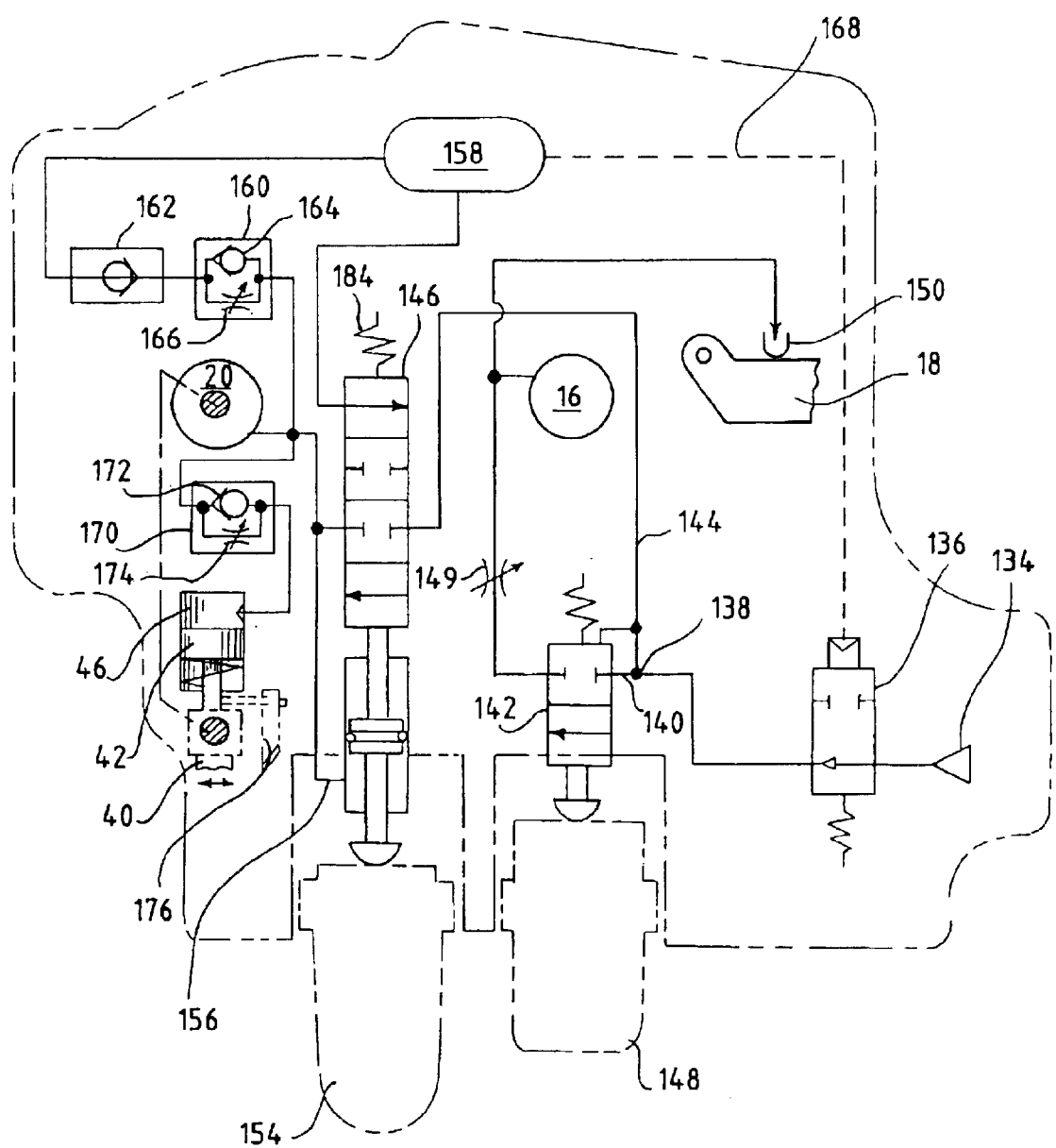
FIG. 13 is a schematic view of the self contained pneumatic module.

Referring now to FIGS. 7 and 12–13, the pneumatic module 24 is removably mounted to the cylinder housing 22. The module 24 includes a plurality of components (e.g., switches, valves, accumulators) to control the overall operation of the strapper 10. The module 24 is configured to readily mount to and be removed from the housing 22 by, for example, the exemplary bolts 30 (FIG. 1). In this manner, in the event that maintenance is required on the pneumatic module 24, the module 24 can be removed and a replacement module 24 can be readily installed on the tool 10 for continued use.

Referring to FIG. 13, a pneumatic schematic is shown. Air enters the tool 10 through a compressed air supply 134 and enters a pilot valve 136. The pilot valve 136 is two position valve (on-off) that is biased to the on position (as shown). The on position routes air to a juncture 138 at which the air supply splits with one branch 140 routing air to a tension motor valve 142 and the other branch 144 routing air to a weld cycle valve 146.

Depressing or actuating a tensioning motor switch 148 moves the tensioning motor valve 142 into the open position, routing air through a variable orifice 149 to the tensioning motor 16 and routing air to a tensioning piston 150. The variable orifice 149 is adjustable to provide control of the tensioning motor 16 power output. (Note that the tensioning motor valve 142 is shown in the off or closed position.) The piston 150 extends downwardly from the cylinder housing 22 and applies a force against the tensioning motor housing 18 when the tensioning motor 16 is actuated. The piston 150 provides an assist to the spring force of the tool 10 to the engaged position. A spring 152 is positioned above the piston 150 to bias the piston 150 downwardly against the motor housing 18. Releasing the tensioning motor switch 148 closes the tensioning motor valve 142, terminating the air feed to the tensioning motor 16 and to the piston 150.

As set forth above, depressing the tensioning motor switch 148 actuates the tension motor 16 which rotates, driving the drive shaft 68, which in turn rotates the feed wheel 56 to tension the strap S. When a predetermined tension is reached, the motor 16 stalls, and rotation of the feed wheel 56 ceases. Releasing the switch 148 merely stops the feed of air to the motor 16. Because of the transmission 74 configuration, i.e., the one-way bearing 76, the shaft 56 cannot rotate backward (that is to relieve tension on the strap S), even though the force exerted by the tensioned strap S tends to rotate the feed wheel 56 rearwardly.

A weld cycle switch 154 operates the weld cycle valve 146. Depressing the switch 154 moves the valve 146 to the on position. (Note that the valve 146 is shown in the off or closed position.) The weld cycle valve 146 is a contact or maintain valve. In the on position, air is routed through the second line branch 144 to the valve 146. Air enters the valve 146 and is routed to the weld motor 20. A line tee 156 from the weld motor line 144 is routed back to the weld cycle valve 146 to "hold" the valve 146 in the on position. The valve 146 is biased to the closed position, however, the air pressure "holding" the valve 146 open is sufficiently high to overcome the spring force.

At the same time that air is routed to the weld motor 20, air is directed to a volume chamber or accumulator 158, through a weld timer 160 and check valve 162 for weld timing. The weld timer 160 is a check valve 164 in parallel with a restriction device such as the illustrated orifice 166. In this manner, air flow into the accumulator 158 is restricted (and thus timed) in that flow through the orifice is limited or restricted. A line 168 from the accumulator 158 is routed to the pilot valve 136, so that as the pressure in the accumulator 158 increases, air flows to the pilot valve 136. When the air in the accumulator 158 reaches a predetermined pressure, the pilot valve 136 closes, thus stopping air flow to the weld cycle valve 146. This stops operation of the weld motor 20.

When air flow is terminated to the weld cycle valve 146, the pressure exerted to maintain the valve open (through line 156) also drops, and the valve 146 returns to the closed position by action of the bias.

Returning to the weld cycle, as air is provided to the weld motor 20, air is also routed to the weld cylinder 46 (to the top of the piston) to maintain pressure on the piston 42 (which assures that sufficient pressure is applied by the weld element 40 on the strap S). The air is routed to the top of the weld cylinder 46 through a cool down timer 170. As set forth above, after welding is complete, the strap S must be allowed sufficient time to cool assure the integrity of the weld. Cool down is accomplish with pressure applied by the weld element 40 on the strap S (pressure on the piston 42), without the vibrational 40 motion of the element being imparted.

The cool down timer 170 maintains pressure on the piston 42 without vibrational motion of the weld element 40. When the air to the weld motor is stopped, the weld element 40 ceases to vibrate. The air routed to the top of the weld cylinder 46 is slowly vented from the cylinder 46 by a restricted vent path from the top of the cylinder 46. The cool down timer 170 is configured similar to the weld timer 160 and includes a check valve 172 in parallel with a restriction device such as an orifice 174. In this manner, although the weld motor 20 has stopped, the pressure exerted by the (piston 42 and the) weld element 40 is maintained and is slowly released by the timed venting from the cylinder 46.

A cutter 176 is mounted to move downwardly into the strap upper layer $S_U$ along with the weld element 40. The cutter 176 is mounted to the weld piston 42 by a spring 178 so that the force exerted on the strap S is variable, to assure that the top layer of strap $S_U$ is cut, but to also prevent cutting into lower layer of strap material $S_L$.

Completing the pneumatic circuit, the accumulator 158 is vented through the weld cycle valve 146 when the valve 146 is in the off position. The vent is closed when the valve 146 is in the open position. Those skilled in the art will recognize and understand that the various references to "lines", "vent paths" and the like are provided by a plurality of openings formed, e.g., machined, in the module 24, as shown generally in FIG. 12.

In operation, strap S is fed around the load L with the free end R positioned as the lower layer of strap $S_L$ and the feed end F positioned as the upper layer of strap $S_U$. The strap S is fed into the strapper 10 with the strapper in the loading/unloading position (the tensioning motor housing 18 pulled upward). Both layers $S_U$, $S_L$ are properly positioned in the strapper 10, and the motor housing 18 is released to move to the tool 10 to the engaged position. With the motor housing 18 released, the guide 120 moves downwardly to align the strap material layers $S_U$, $S_L$.

The tensioning motor switch 148 is depressed (moving the tensioning motor valve 142 to the on position) which actuates the tensioning motor 16 and the tensioning piston 150. The motor 16 rotates which in turn rotates the feed wheel 56 tensioning the strap S. When a predetermined tension is reached, the motor 16 stalls. The tensioning motor switch 148 is then released which terminates air flow to the motor 16 and to the piston 150. The strap S is, however, held securely by the feed wheel 56 which is prevented from rotating rearwardly by the transmission 74 (i.e., the one-way bearing 76).

The weld cycle switch 154 is then depressed to move the weld cycle valve 146 to the on position. As set forth above, this is a contact or maintain type switch. Compressed air is routed to the valve 146 (bypassing the tensioning motor valve1 142), and is routed to the weld motor 20, to the weld cylinder 46 (through the cool down timer 170), to the accumulator 158 (through the weld timer 160), and to the valve 146 to maintain the valve 146 open. The weld piston 42 is forced downwardly onto the strap S and the motor 20 is actuated to form the weld. At the same time, the strap upper layer $S_U$ is cut by the cutter 176 (which is moved into contact with the strap upper layer $S_U$ by the piston 42). As pressure in the accumulator 158 reaches a predetermined value (by passage of air though the weld timer 160), the pilot valve 136 closes thus terminating the flow of air to (and in turn from) the weld cycle valve 146.

When air flow is terminated from the weld cycle valve 146, the motor 20 stops and the valve 146 returns to the off position by action of the bias 184 (spring). Weld cylinder 46 pressure slowly decreases by venting through the cool down timer 170. As pressure in the cylinder 46 decreases, the piston spring 182 returns the piston 42 to the home position, moving the weld element 40 and cutter 176 from the strap S.

The release handle 112 is then gripped moving the plunger 110 into the collar opening 108 to cam against the collar 80 and effect release of the drive shaft 68 and feed wheel 56. This reduces the tension in the strap S to permit removing the tool 10 from the welded strap S and load L.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications fall within the scope of the claims.

What is claimed is:

1. A pneumatic strapping tool for tensioning a strap around a load, adhering the strap onto itself, and cutting a feed end of the strap, comprising:

a body;

a foot having an anvil and defining a strap path between the foot and the body;

a weld motor mounted to the body;

a weld element operably connected to the weld motor for contacting the strap and adhering the strap onto itself;

a tensioning motor housing pivotally mounted to the body for pivoting between a loading/unloading position and a strap engaging position;

a tensioning motor carried by the tensioning motor housing, the tensioning motor configured for rotation;

a feed wheel operably connected to the tensioning motor for rotation therewith and rotatable about a feed wheel shaft, the feed wheel being operably connected to the tensioning motor housing for pivoting therewith relative to the body and for tensioning a strap positioned between the feed wheel and the anvil; and an articulating guide disposed at the strap path and movable between an open path position when the tensioning motor housing is pivoted to the loading/unloading position to permit inserting a strap between the feed wheel and anvil, and a closed path position when the tensioning motor housing is pivoted to the strap engaging position to block insertion of the strap between the feed wheel and the anvil and to align the strap with a second strap to which the strap is to be adhered, the guide further configured to align the strap and the second strap with the feed wheel and anvil.

2. The strapping tool in accordance with claim 1 wherein the guide is pivotable about the feed wheel shaft.

3. The strapping tool in accordance with claim 2 wherein the guide includes an elongated slot and wherein the strapping tool includes a pin extending therefrom, the pin being fixed relative to the pivotal movement of the tensioning motor housing, the pin engaging the slot to pivot the guide between the open path position and the closed path position.

4. The strapping tool in accordance with claim 3 including a feed wheel cover, the feed wheel cover having a notch formed therein for receiving a portion of the guide when the guide is pivoted to the closed path position.

5. The strapping tool in accordance with claim 1 wherein the guide includes a finger depending therefrom for movement in to and out of the strap path.

6. The strapping tool in accordance with claim 5 wherein the finger is formed in a plane spaced inwardly of a plane of the guide to urge the strap toward the feed wheel and anvil when the finger contacts the strap.

* * * * *